United States Patent Office 3,127,336
Patented Mar. 31, 1964

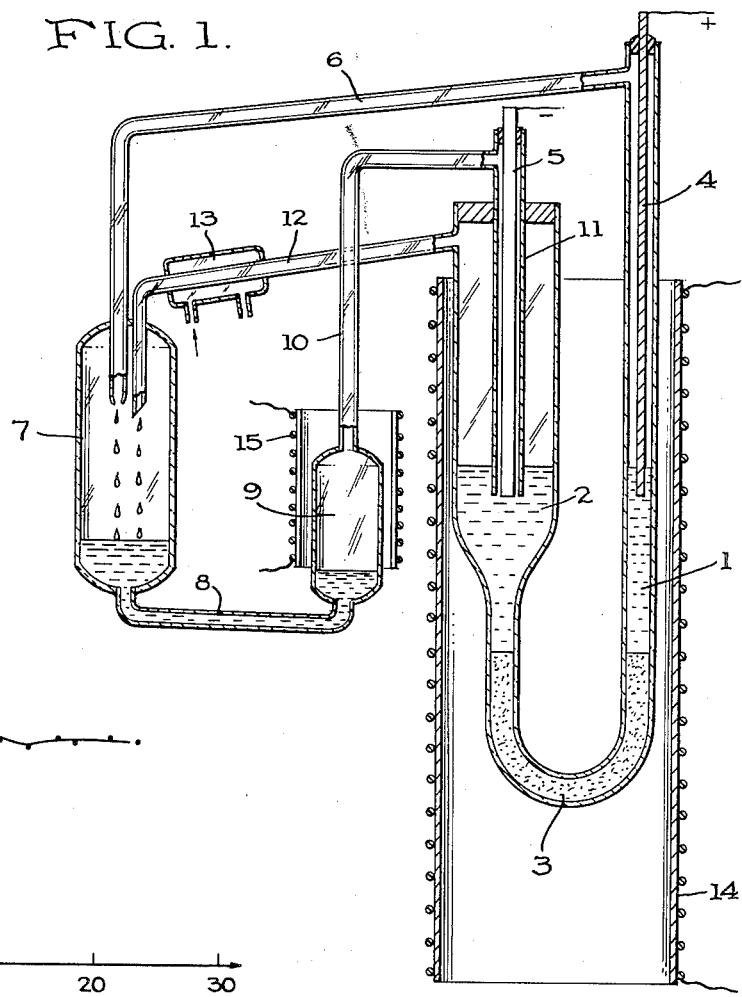
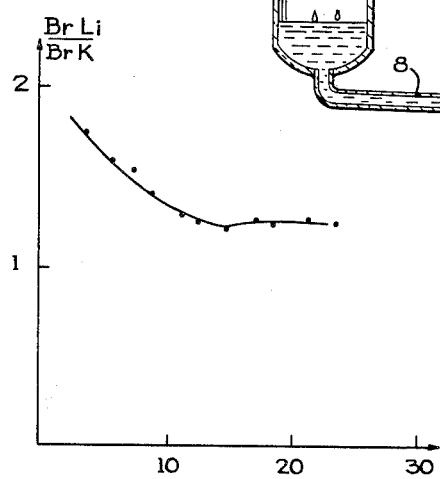
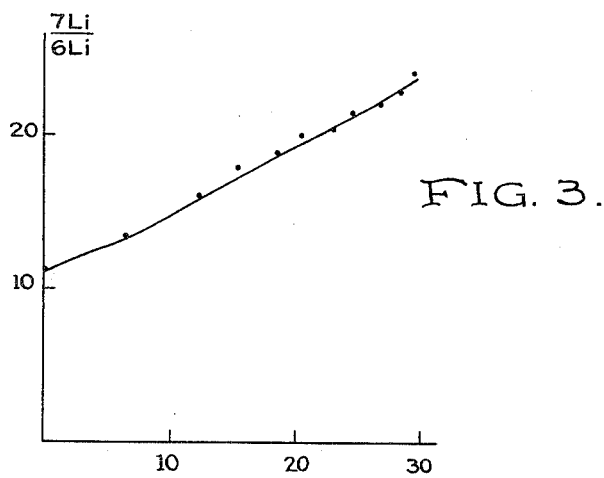

3,127,336
PROCESS OF ISOTOPE SEPARATION BY COUNTER-CURRENT ELECTROMIGRATION IN FUSED SALTS
Marius Salomon Chemla, Maisons Alfort, France, assignor to Commissariat a l'Energie Atomique, Paris, France
Filed Nov. 20, 1959, Ser. No. 854,475
Claims priority, application France Nov. 24, 1958
6 Claims. (Cl. 204—180)

This invention is concerned with improvements in or relating to the separation of isotopes, and is more particularly concerned with isotopic separation by counter-current electromigration in fused salts.

The separation of the isotopes of certain elements which do not form gaseous compounds and with which diffusion techniques cannot therefore be used, appears to be possible only by methods carried out in a condensed medium, such as chromatography or electromigration. At present, it seems that only counter-current electromigration methods are capable of being used on an industrial scale.

The process of counter-current electromigration in aqueous solutions involves numerous disadvantages. In particular, any heating of the diaphragm caused by current flow results in gas being given off. The counter-current is produced by an input of liquid which must be carefully adjusted. Finally, the isotope separation achieved is very small.

A more advantageous method uses counter-current electromigration in fused salts. This method possesses the advantage of employing a medium very rich in ions which is therefore a good conductor and enables a high electrolysis current to be employed, and allows the heat given off to be easily dissipated. As the substance treated is a salt of definite composition, only the cathode compartment need be neutralised to give an exact counter-current. Finally, the isotope separtaion achieved is large.

Nevertheless, the melting points of the salts are fairly high in some cases and at these temperatures the salts used often have an extremely corrosive action on the various materials used in the construction of the apparatus in which the process is carried out. This is so in the case of lithium salts; in addition, lithium halides exhibit an appreciable vapour pressure at their melting point, so that the salts condense, particularly in the pipes through which the halogen used for neutralising the cathode compartment is circulated. In addition, at high temperature halogens attack graphite electrodes to form organic halides.

We have now developed an improved process of isotope separation by reflux electromigration in fused salts which enables the foregoing disadvantages to be largely or wholly overcome.

This process is essentially characterised in that the melting point of the salt to be electrolysed is lowered by the addition of a second salt which has the same anion as the first and which is so chosen that the mobility of its cation is as near as possible to that of the isotope cations of the salt to be electrolysed, and in that the compound forming the anion common to the two salts is recycled to the cathode compartment to an extent sufficient to prevent the deposition of metal.

In fact, the process of counter-current electromigration which is capable of effecting isotope enrichment, will also cause the mixture to be enriched in one of its constituents, which may cause one of the said constituents to be precipitated. For this reason, operation must not, in principle, be carried out with eutectic mixtures at a minimum temperature on the melting curve, since variations in the composition of the contents of the anode and cathode compartments would lead to crystallisation. Nevertheless, if the mobility of the ions of the second salt is sufficiently near to that of the ions of the salt to be electrolysed, the two salts will become unmixed sufficiently slowly, even under initial conditions of temperature and composition in the vicinity of the eutectic point, to allow the isotope to be appreciably separated without any risk of crystallisation. Moreover, unmixing may stop at a certain limit in consequence of the composition gradient produced in the diaphragm, the mobility of each ion varying considerably with the composition of the medium.

In order that the invention may be more fully understood, the following example is given by way of illustration only; this example will be described with reference to the accompanying drawings in which:

FIGURE 1 is a diagrammatic representation of an electrolytic cell suitable for carrying out the process according to the invention;

FIGURE 2 is a curve showing the variation in the ratio of the concentrations of the two salts in the anode compartment as a function of time, and FIGURE 3 is a curve showing the variation in the ratio of the concentrations of the two isotopes of the first salt in the anode compartment as a function of time.

In this example, lithium isotopes were separated by reflux electromigration in fused lithium bromide. According to the invention, the melting point of lithium bromide was lowered by 150° C. by the addition of potassium bromide, the mixture of salts containing 30% by weight of the latter salt.

Under these conditions, the process could be carried out in apparatus constructed of "Pyrex" glass upon which the corrosive action of the fused salts was very slight; in addition, at this temperature sublimation was negligible. The potassium cation was chosen because its mobility is very close to that of the lithium cation under the conditions of the experiment. The use of bromides enables the bromine, which is liquid, to be circulated in a closed circuit, so that the counter-current is necessarily accurately produced and the electrolytic cell can be operated indefinitely without attention from the operator.

The electrolytic cell illustrated in FIGURE 1 comprises an anode compartment 1 and a cathode compartment 2 separted by a diaphragm 3. The diaphragm 3 consists of a U-shaped tube of 8 mm. internal diameter filled over a length of 10 cm. with zirconia grains 0.5 mm. in diameter. The compartments 1 and 2 are respectively provided with electrodes 4 and 5 made of graphite. The bromine given off at the anode is conveyed via a pipe 6, after condensation, to a reservoir 7. From the reservoir 7, a pipe 8 conveys it to a boiler 9, from which bromine vapour is led via pipes 10 and 11 to the cathode compartment 2, the bromine vapour being bubbled into the mixture in the cathode compartment and thus preventing metal from being deposited. After being bubbled through the cathode compartment 2, the bromine is returned via a pipe 12, after condensation at 13, to the reservoir 7. The two compartments 1 and 2 and the diaphragm 3 are situated in an oven 14 which keeps the mixture of salts in the fused state. The bromine is vaporised in the boiler by an auxiliary oven 15.

This electrolytic cell was charged with a mixture consisting of 70% by weight of lithium bromide and 30% by weight of potassium bromide, approximately 10 gm. of the mixed salts being charged into the anode compartment 1 and approximately 40 gm. into the cathode compartment 2. The oven 14, and hence the compartments 1 and 2 and the diaphragm 3, was heated to a temperature of 500° C. and electrolysis was effected with an electrolysis current of 0.3 a. at 30 v. for 30 days. During electromigration, the ratios K+/Li+ and $^7$Li+/$^6$Li+ evolve simultaneously.

The variation in the ratio Li Br/K Br in the anode compartment as a function of time is plotted in FIGURE 2. This ratio decreased regularly in the first 12 days from 2.0 to 1.1, and did not vary thereafter, so that separation of the lithium isotopes could be continued without any risk of precipitation.

The variation in the ratio $^7Li/^6Li$ in the anode compartment as a function of time is plotted in FIGURE 3. This ratio increased regularly from 11.7 to 22.4 in thirty days.

I claim:

1. In a process for the separation of isotopic cations by electromigration in a bath of a fused salt of the cations conducted in an anode compartment and a cathode compartment separated by a diaphragm using a fused salt countercurrent from the cathode to the anode, the steps of mixing with the salt before electromigration another salt having the same anion as that associated with the isotopic cations and having a cation of substantially the same mobility as the isotopic cations to be separated, and continuously collecting the anions which appear at the anode and continuously recirculating the anions from the anode to the cathode in a closed circuit.

2. A process as described in claim 1 in which the common anion is the bromine anion and said anion appearing in vapour phase at the anode is condensed and returned to said cathode.

3. In a process for the separation of isotopic cations by electromigration in a bath of a fused bromide of the cations conducted in an anode compartment and a cathode compartment separated by a diaphragm, using a fused salt countercurrent from the cathode to the anode, the steps of mixing with said bromide before electromigration another bromide having a cation of substantially the same mobility as the isotopic cations to be separated and recirculating bromine liberated at the anode back into the bath at the cathode via a closed circuit whereby deposit of said cations is prevented.

4. A process as described in claim 3 conducted at temperatures adjacent and above the melting temperature of the mixture of the salts.

5. In a process a process for the separation of isotopic lithium cations by electromigration in a bath of fused lithium bromide conducted in an anode compartment and a cathode compartment separated by a diaphragm, using a fused salt countercurrent from the cathode to the anode, the steps of mixing potassium bromide with lithium bromide before electromigration and delivering into the bath at the cathode a quantity of bromine sufficient to prevent deposit of said cations.

6. A process as described in claim 5 in which the mixture of the two salts contains 30% by weight of potassium bromide.

References Cited in the file of this patent

UNITED STATES PATENTS

| | | |
|---|---|---|
| 886,857 | Price et al. | May 5, 1908 |
| 1,116,865 | Acker | Nov. 10, 1914 |
| 2,813,064 | Clark | Nov. 12, 1957 |

FOREIGN PATENTS

| | | |
|---|---|---|
| 1,190,099 | France | Mar. 31, 1959 |

OTHER REFERENCES

A. Lunden: Zeitschrift für Naturforschung, vol. 11A, pages 75–79 (1956).

Chemla: Proceedings of the Symposium on Isotope Separation, April 1957, pages 288–307, North-Holland Publ. Co. Amsterdam.